US007497772B2

(12) United States Patent
Laib

(10) Patent No.: US 7,497,772 B2
(45) Date of Patent: Mar. 3, 2009

(54) QUICK CHANGE RESTRICTOR PLATE

(75) Inventor: Trevor M. Laib, Woodinville, WA (US)

(73) Assignee: The Boeing Company, Chicago, IL (US)

( * ) Notice: Subject to any disclaimer, the term of this patent is extended or adjusted under 35 U.S.C. 154(b) by 7 days.

(21) Appl. No.: 11/490,992

(22) Filed: Jul. 20, 2006

(65) Prior Publication Data

US 2008/0018103 A1  Jan. 24, 2008

(51) Int. Cl.
*F24F 13/08* (2006.01)
*B64D 13/06* (2006.01)
*G01F 1/42* (2006.01)

(52) U.S. Cl. .......................... 454/333; 454/71; 454/76; 138/44; 138/94

(58) Field of Classification Search ................. 454/333, 454/71, 76; 73/861.61; 138/94, 94.3, 44
See application file for complete search history.

(56) References Cited

U.S. PATENT DOCUMENTS

| 1,342,620 | A | * | 6/1920 | Bradshaw | 138/94.3 |
| 1,662,374 | A | * | 3/1928 | Woodmansee | 138/44 |
| 1,838,656 | A | * | 12/1931 | Bullock | 138/94.3 |
| 2,007,036 | A | * | 7/1935 | Cornell, Jr. | 138/44 |
| 2,029,151 | A | * | 1/1936 | Bigelow | 138/94.3 |
| 2,200,558 | A | * | 5/1940 | Mayers | 138/94.3 |
| 2,228,857 | A | * | 1/1941 | Stephenson | 236/45 |
| 2,242,467 | A | * | 5/1941 | Hamer | 138/94.3 |
| 2,645,244 | A | * | 7/1953 | Klickman | 137/561 R |
| 3,891,146 | A | * | 6/1975 | Blazek | 138/94.3 |
| 4,422,339 | A | * | 12/1983 | Gall et al. | 73/861.61 |
| 4,960,546 | A | * | 10/1990 | Tharp | 261/122.1 |
| 5,494,079 | A | * | 2/1996 | Tiedemann | 138/94.3 |

FOREIGN PATENT DOCUMENTS

WO   WO 1995/24580   9/1995

* cited by examiner

*Primary Examiner*—Steven B McAllister
*Assistant Examiner*—Patrick F. O'Reilly, III

(57) ABSTRACT

A "quick change" restrictor assembly that allows quick rebalancing of flow-pressures within a duct system. The invention comprises a removable restrictor plate, a branch circuit for receiving the plate, and a means for retaining the restrictor plate to the branch circuit. The circuit includes a feature that allows for removal and installation of the restrictor plate without removing the branch circuit, inlet or outlet ducting. The quick change restrictor will not require bonding and can be installed easily from outside the duct without any disassembly. The restrictor may also have various clips or tabs to reinforce the slot the restrictor plate is inserted into. The restrictor may also have a smart part number and color code that is visible from outside the duct allowing easy removal, identification and inspection.

8 Claims, 6 Drawing Sheets

QUICK CHANGE RESTRICTOR PLATE

FIELD OF THE INVENTION

This application is related to controlling the airflow through lightweight aircraft ducting and more particularly to an adapter for establishing a branch circuit in an existing installed duct and diverting air from there in a controllable manner.

BACKGROUND OF THE INVENTION

Installed air ducts are typically assembled from tube sections that are coupled with a variety of connectors, tees and vents. Modification of existing systems requires severing the ducting and installing a new connector such as a tee to divert flow in a new direction. Additional vents or control valves can be installed in the branch circuit to regulate the flow. The connectors are expensive and add weight to the system. In addition, installation of a conventional connector permanently alters the ductwork and even if the branch circuit were removed, a replacement coupling would have to be reinstalled. Alterations of this sort sever the continuity of the duct and add potential leaks to the system.

When a branch duct is added to a ducting system, a method is required to control the airflow through that branch. Commonly, this is done by inserting a perforated metal or plastic "restrictor plate" into the duct joint. Sometimes, restrictor plates are installed on branch ducts such that the airflow through the duct tends to pull the aperture away from the branch. An adhesive or bonding agent is generally used to ensure that restrictor plates do not become detached or misaligned within the duct. Adhered restrictor plates are also less susceptible to vibration and will retain more strength following damage due to corrosion. Further, adhered restrictor plates cannot be misplaced when ducting is disassembled for maintenance.

Unfortunately, using bonding agents can present problems. Bonding agents require time to cure, consequently manufacturing planners typically desire all restrictor plates to be bonded to the ducts at the assembly level to reduce delays in a factory. This practice can be impractical however; if assembly drawings are released before a final determination of the flow balance for an application is available. Furthermore, late customer changes and problems discovered during air flow balance tests can also lead to restrictor plate changes, sometimes moments before delivery. Making these changes on the assembly level would require significant changes to assembly and installation drawings at a considerable cost.

Accordingly there exists a need to enable late-stage modification and installation of airflow restrictor plates to accommodate engineering processes, preventing accidental changes to restrictor plates during modification to ensure safety and performance, while avoiding the expense and delays of bonding to accommodate manufacturing processes.

This concept allows a conventional, easy-to-analyze, restrictor that can be quickly inspected and changed without disassembling or severing ducts into pieces. The design attempts to dramatically reduce the time to install restrictor plates, the time to inspect and verify restrictor installations, and the time to change restrictor plate installations after assembly.

DETAILED DESCRIPTION

Figure 1:
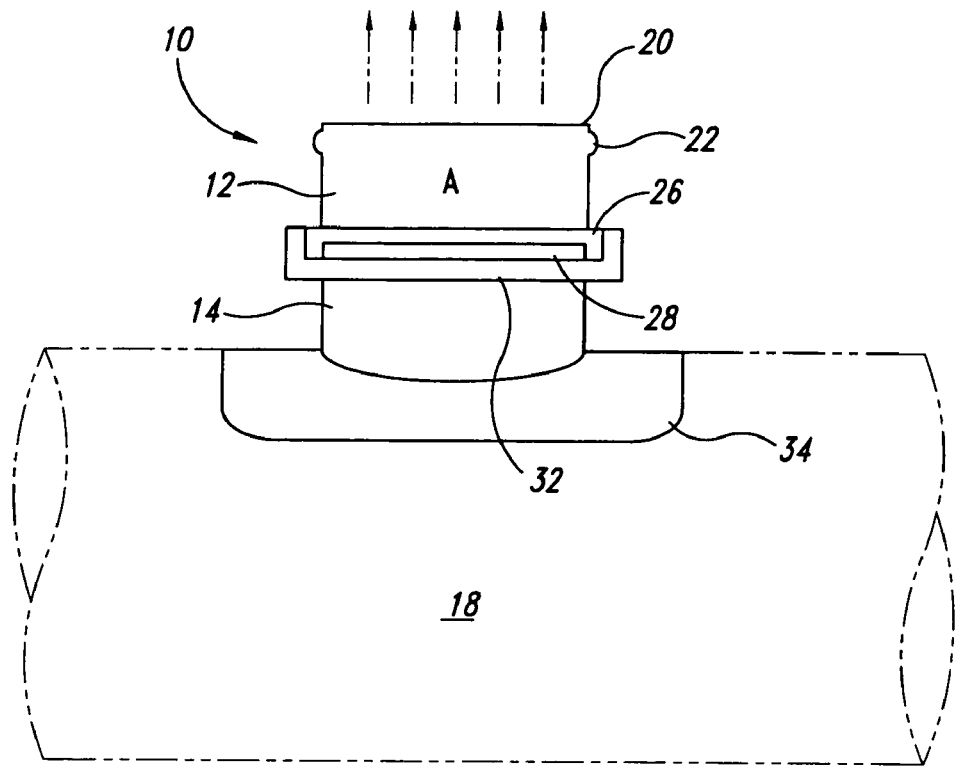
FIG. 1 is an illustration of one embodiment of the invented quick change restrictor plate device, installed in a 90° branch duct assembly configuration.
Figure 2:
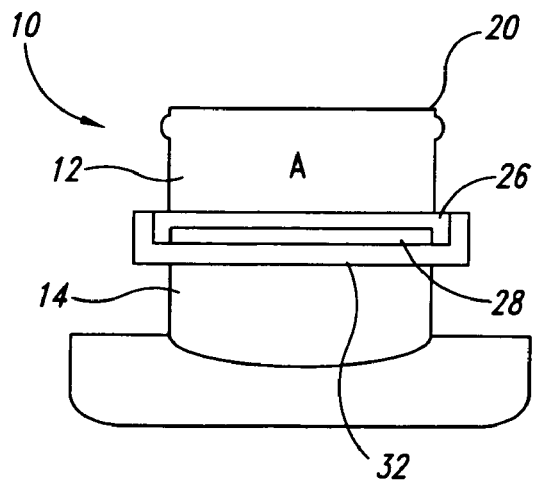
FIG. 2 is an illustration of a closer view of the device and a more detailed depiction of the interconnecting relationship of the tee and nozzle sections.

A ducting adapter 10, for creating a branch circuit is shown in FIG. 1. Preferably the adapter 10 comprises a first nozzle section 12 and a second "tee" section 14. The nozzle section includes an opening 20 having a bead 22 for attachment to a duct system (not shown). The nozzle portion 12 includes a base 26 which can be interconnectedly joined with a mating portion 32 of the tee section 14 to form a locking combination that may also include bonding the combination, see FIG. 2, 7 & 8, defining a slot opening 28 therein for receiving restrictor plates 50 such as those shown in FIG. 4 therein. The tee section 14 may include an upper mating joint 32 for engaging the base 26 of the nozzle to assist with, or in lieu of, bonding. As shown in more detail in FIG. 2 the base 26 is interconnectedly joined with the upper mating joint 32 to fixedly join the nozzle 12 to the tee section 14. Together the joint 32 and the base 26 define an opening 28 for receiving a diverter plate therein.

The tee section 14 also includes an adapter base or saddle 34 for attachment directly to an air supply duct 18 without severing the duct into pieces. Typically a decision is made to add a branch circuit to an existing duct at a particular point. An opening is cut in the duct and the branch circuit adapter 10 is permanently affixed or sealingly affixed to the duct over the opening so that airflow through the opening is directed through the nozzle 20 of the current adapter. The adapter is mounted to the duct with a saddle 34 which can for instance have a configuration adapted to conform to that of the corresponding duct. For example, the saddle would have a 2 inch radius to conform to a 4 inch duct. This sizing allows the saddle to matingly and sealingly engage the duct to ensure desired airflow. The adapter 10 can be permanently mounted with a fastener material such as epoxy cement. One possible alternative configuration would allow bonding the adaptor base to the end of a duct, to provide an interchangeable air flow control point within an air duct.

The quick change restrictor plate is a flat piece of rigid material with a full radius at one end. The diameter of the curved end of the restrictor plate is generally slightly larger than the nozzle diameter 20. Its dimensions are sized to receptively match the width, height, and depth of the slot 28 in the branch circuit. The described flat rigid plates may have one hole or many holes. These plates 50 which can be inserted within the slot opening 28 have a variety of configurations specially designed to control the flow of air through a duct circuit. Ideally a restrictor plate can be sized and ported to provide a manufacturer the flexibility to develop particular hole specifications for a desired application.

When the restrictor plate 50 is installed in a circuit, a portion of the restrictor plate 50 extends beyond the slot 28 and remains exposed, allowing easy removal, identification and inspection. A particular restrictor plate may be clearly identified by part number, open flow area, a color code, or perhaps RF identification can be imprinted on the exposed edge of the plate.

Figure 3:
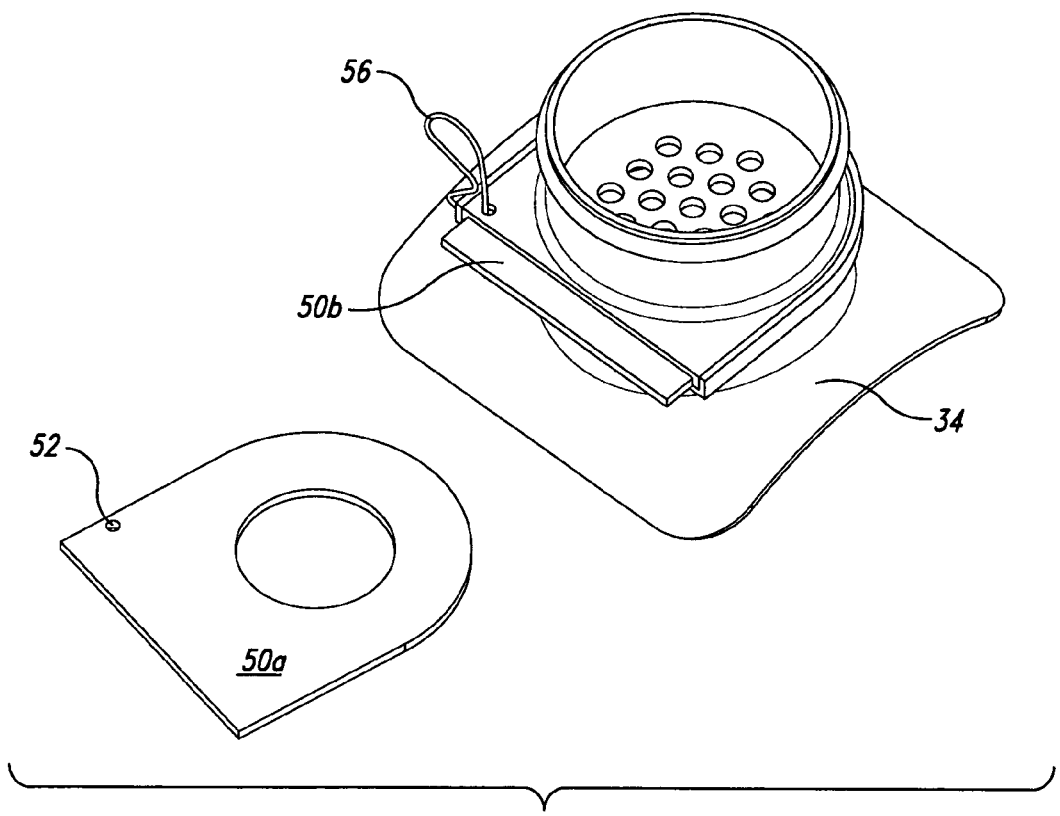
FIG. 3 is a perspective illustrative view of one embodiment of the invented quick change restrictor plate device, with an example of an inserted locking pin (56).
Figure 4:
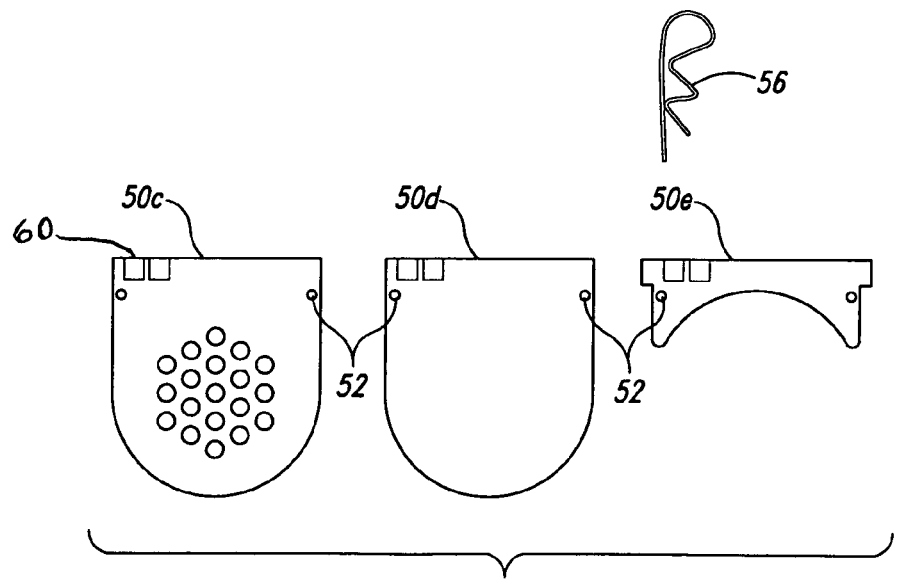
FIG. 4 are perspective illustrative views of possible restrictor configurations for a quick change restrictor plate with associated labeling.

As is indicated above, the slot opening 28 shown in FIG. 3 interchangeably receives restrictor plates 50a, 50b, 50c and 50d, 50e, shown in FIG. 4, in a snug fit and locked position within the opening. More particularly for this embodiment, the opening 28 has an arciform (shape of an arc) cross section and a restrictor has a similar exterior configuration adapted to fit snugly within the opening 28. This snug fit insures that the restrictor plate 50 performs optimally and diverts or regulates air in a desired manner. In addition, a locking pin 56 can be inserted through a hole 52 in the restrictor plate 50 into a corresponding opening 22a in the adapter joint 32. The inserted locking pin 56 ensures that the restrictor plate 50 is not dislodged by vibrations. The locking pin 56 avoids the need for glues and allows the restrictor plate 50 to be interchanged as conditions require by removing the locking pin 56, replacing the restrictor plate 50 and reinserting the locking pin 56. The function of the locking pin may also be performed by lockwire, a racheting cable tie, a plastic fastener, or any number of other similar devices which may be engaged through a hole.

Figure 5:
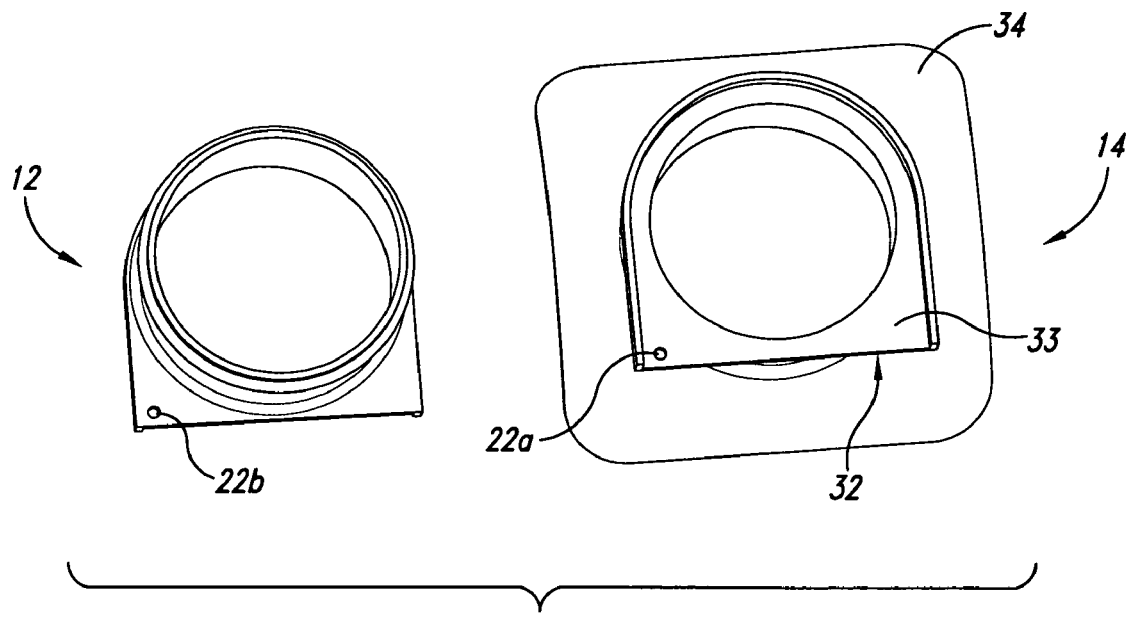
FIG. 5 is a disengaged illustrative view of a two piece section of the adaptor plate holder.
Figure 6:
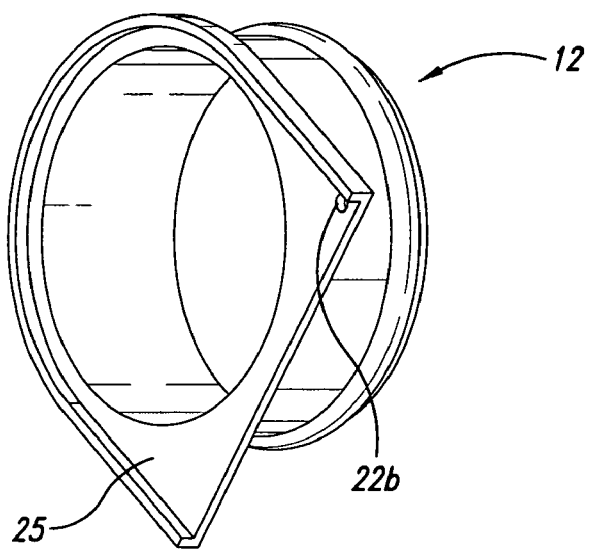
FIG. 6 is a 45 degree view of the nozzle section (12) depicting its lower base member seat (25).
Figure 7:
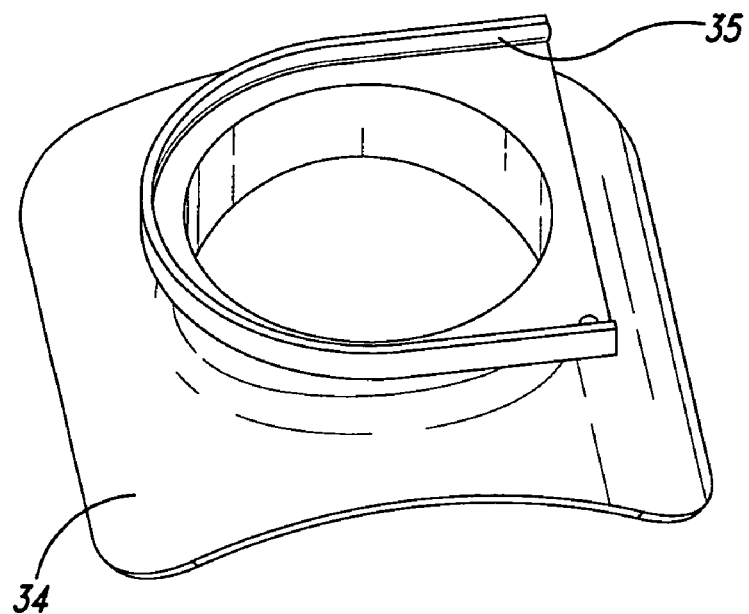
FIG. 7 is a 45 degree view of the tee section (14).
Figure 8:
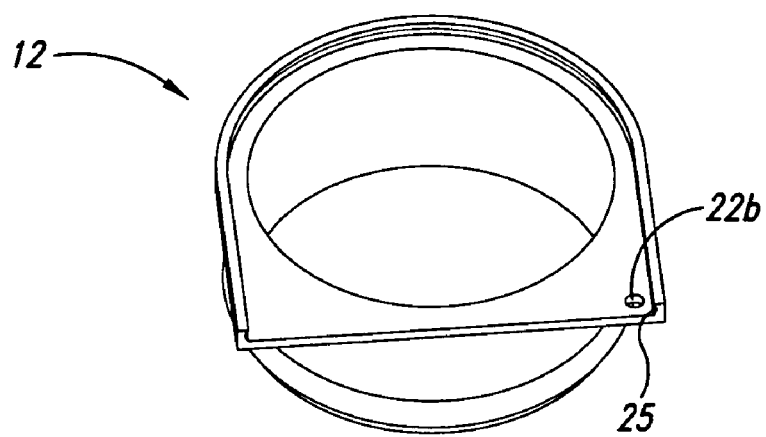
FIG. 8 is an frontal 45 degree view of the nozzle section (12).
Figure 9:
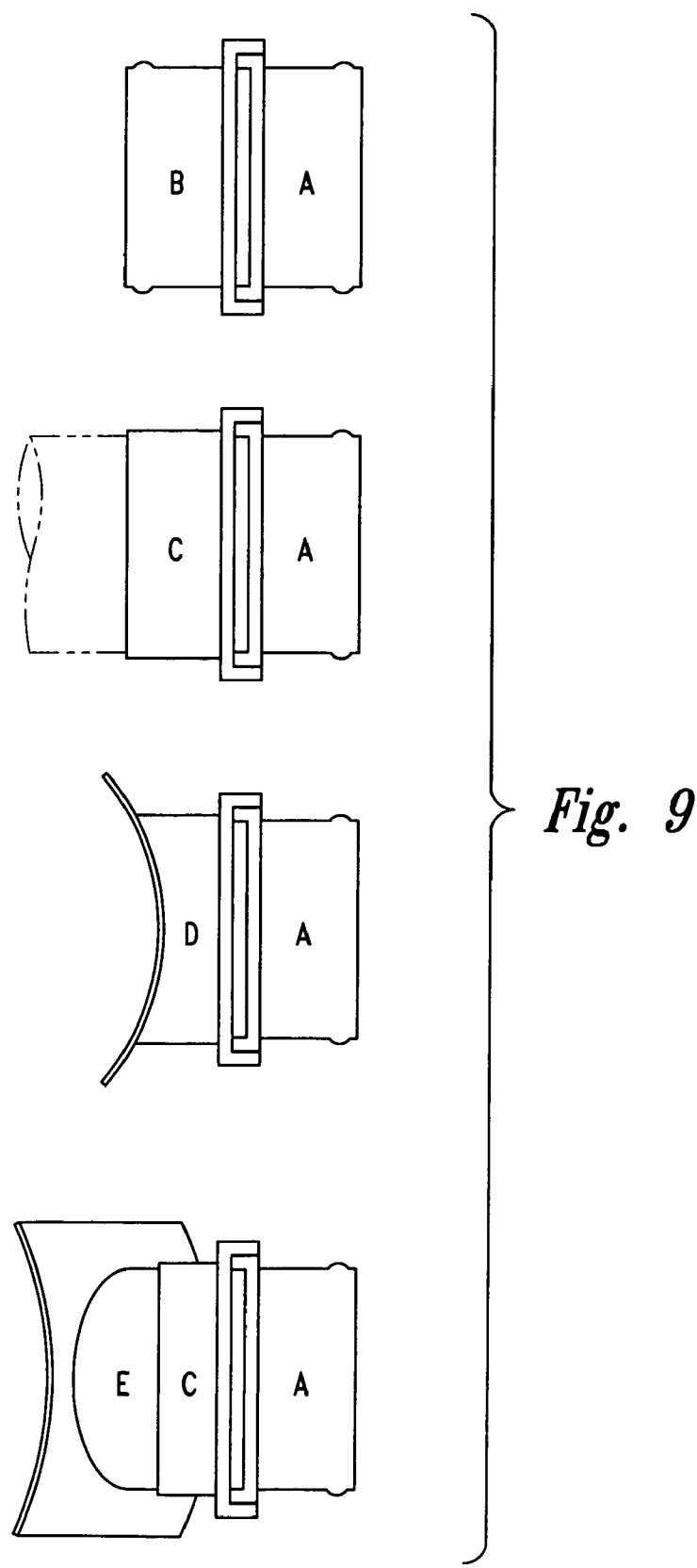
FIG. 9 depicts illustrations of a variety of possible branch duct configurations for a desired air flow design. The B/A configuration illustrates an inline splice with two beads assy. The C/A configuration illustrates a bond-on duct end assy. The D/A configuration illustrates a 90° branch duct assy. The E/C/A configuration illustrates a 45° branch duct assy.
Figure 10:
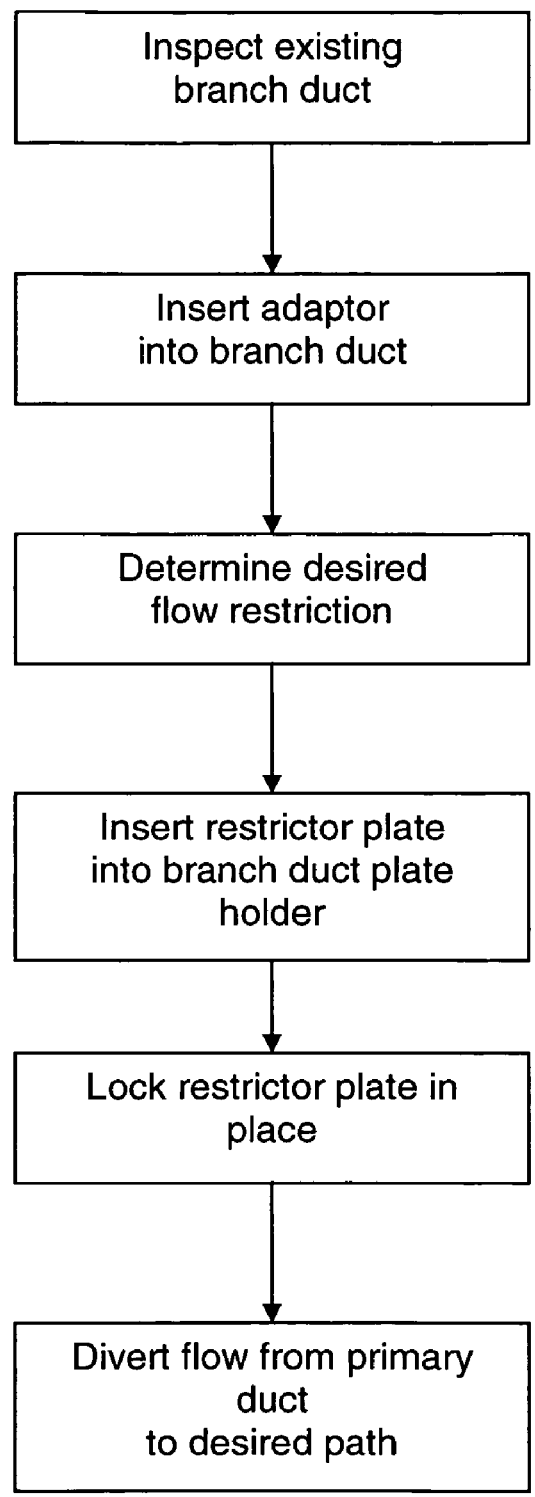
FIG. 10 is a flow chart depicting the method of assembling the branch circuit adapter and controlling flow from this circuit.

While it is recognized that the present structure can be constructed in a single piece, a more practical embodiment employs a two-piece construction to beneficially form a seat 25, 33 for the restrictor plate 50 with the opening 28. As shown in FIG. 5, the tee portion 14 includes an upper joint 32 which is shown to comprise a substantially planar or flat U-shaped surface or seat 33. The seat 33 is optionally surrounded by a U-shaped bead 35 FIGS. 7 & 8 which matingly engages a U-shaped channel 25 on the nozzle section 12. A lock pin hole 22a is provided on the exterior edge of the seat 33.

The nozzle portion 12 includes a lower base member 26 for mating with the upper joint 32 of the tee portion 14. The base member 26 includes a seat 25 having a substantially planar surface and which, when positioned in opposed relation to the seat 33 of the tee portion 14, forms a U-shaped channel having upper and lower walls 33 and 25 which are approximately parallel. The distance between the upper and lower walls is approximately 0.06 inches or only slightly more than the thickness of a restrictor plate such that a snug fit between the restrictor plate 50 and the opening 28 is ensured. The upper joint includes a U-shaped channel portion having an interior surface for receiving the bead of the upper joint in a snug fit locked position. The upper seat 25 includes a lock pin hole 22b through which a lock pin 56 can be inserted. The restrictor plate 50 also includes lock pin openings 52. When the nozzle portion 12 is inserted within tee portion 14 the nozzle opening 20 aligns over the opening in the tee and the lock pin opening 22a aligns with the lock pin opening 22b.

The two piece adapter 10 provides a further benefit when a decision is made to remove a previously installed branch circuit. The locking pin 56 is removed, the restrictor plate 50 is removed, the nozzle portion 12 may be slidingly separated from tee portion 14 and a closure plate 50d may be inserted in place of the nozzle portion to block the opening. This allows the branch circuit to be quickly and easily removed and the branch circuit efficiently capped avoids the need for further work on the duct itself. Alternately, when no restriction at all is required in a given branch circuit, a "gap filler" plate 50e may be used to close slot 28 without placing a restrictor within. This gap filler plate may also include tabs 60 to properly align the gap filler plate within the slot 28.

Enhancements to the two piece adapter 10 may include:
Reinforcing ribs on flanges 26 and 32 to maintain a tight tolerance on the width of slot 28 to prevent leakage.
Gasketing material printed on or applied to the faces of restrictor plate 50 at the point where it engages in slot 28.
A stiffening clip attached to, or formed as a part of, restrictor plate 50 such that when the restrictor plate 50 is fully engaged into slot 28, the stiffening clip pinches flanges 26 and 32 at particular points, or along their entire length, such that leakage is reduced through slot 28.
A stiffening clip attached to the adapter assembly 10 as a separate part which would cover restrictor plate 50 when it is fully engaged into slot 28, thereby pinching flanges 26 and 32 at particular points, or along their entire length, such that leakage is reduced through slot 28. This clip would be retained by locking device 56, or by direct engagement with the adapter 10 or duct 18.
A cap or sleeve over slot 28 such that leakage is reduced through slot 28. This cap or sleeve would be preferentially made of a transparent material so that any part number printed on the exposed edge of restrictor plate 50 would still be visible.

In a method of assembling the branch circuit adapter 10, a location for the branch circuit is first identified. The existing duct 18 is then penetrated and an opening approximately equal to the cross-sectional area of the air channel through the adapter 10 is provided. The adapter saddle 34 is then sealingly secured over the opening to the duct with an appropriate fastening compound such as epoxy. The upper nozzle portion 12 is then lockingly engaged with the tee portion 14. Alternatively the upper nozzle portion 12 may be bonded to the tee portion by applying an appropriate fastening compound, such as epoxy, along the periphery of nozzle flange 26 and then inserting the nozzle flange 26 within the matching flange on tee portion 14. Later, when the duct assembly is installed in the airplane, a restrictor plate 50 is then inserted within the opening 28 defined by the opposed surfaces of the nozzle and tee seats 25 and 33 respectively. A locking device, such as locking pin 56, is inserted through the lock pin openings 22B, 52, and 22A in the nozzle flange 26, restrictor plate 50 and tee flange 32 respectively to fixedly position the restrictor plate 50 within the opening 28. This allows the restrictor plate 50 to remain in position despite substantial airflow through the branch circuit adapter 10.

In a method of controlling airflow through a new branch circuit having a branch circuit adapter 10 secured to a duct 18, airflow is regulated by inserting a restrictor plate 50 within an installed branch circuit adapter 10 to adjust the flow of air respectively and applying a locking pin 56 through the nozzle, adapter and restrictor plates 12, 50 and 14 to ensure the restrictor plate 50 remains in position despite high volumes of airflow.

I claim:

1. A two piece quick change flow duct for creating a branch circuit comprising:
a two part duct branch and plate holder for attachment to a primary duct and for diverting flow therefrom; the duct branch comprises a first lower base portion and a second upper nozzle portion matingly engaging the first lower base portion, the first lower base portion includes a first open faced U-shaped base plate holder portion that is integral with the lower base portion of the duct branch, the second upper nozzle portion including an open faced U-shaped nozzle plate holder having a cross section dimension that is less than the cross sectional dimension of the open faced U-shaped base plate holder, the first and second open faced U-shaped plate holders removeably matingly engaging each other in a snap fit to form a plate holder snug fit plate holder slot, said slot is closed on three sides, comprising reinforcing ribs on flanges, transverse to the flow path, for removeably receiving a restrictor plate in a snug fit, said lower base portion having a concave surface complimentary with the primary duct for sealingly matingly engaging and mounting to the primary duct (18) without completely severing said duct into separate pieces.

wherein the plate perimeter conforms with the slot interior and the height of said slot is approximately equal to 0.06 inches to receive the plate in a snug friction fit, said restrictor plate having a gasketing material applied to the faces thereof and a flow control aperture therethrough for direct insertion into the plate holder, said restrictor plate having a flow control tag such that when the plate is received in the plate holder, flow control aperture characteristics are easily identifiable and said plate restricts flow in accordance with the selected plate aperture, wherein the branch circuit can be easily removed by separating the nozzle portion from the base portion.

2. The two piece quick change flow duct for creating a branch circuit of claim 1 further comprising an unrestricting flow plate, wherein the air flow through the branch duct remains unrestricted when the flow plate is received in the plate holder.

3. the two piece quick change flow duct for creating a branch circuit of claim 1 further comprising a blocking flow plate, wherein the air flow through the branch duct is blocked when the blocking flow plate is received in the plate holder.

4. A two piece quick change flow duct for creating a branch circuit as in claim 1 further comprising a locking pin for holding the plate in said plate holder.

5. A two piece quick change flow duct for creating a branch circuit as in claim 4 further comprising a lock hole through the plate holder to allow fixed insertion of said pin through said holder.

6. The two piece quick change flow duct for creating a branch circuit of claim 1 wherein said lower base portion has a seat for receiving the restrictor plate, and said upper nozzel portion includes a collared portion that is receivable by said lower base portion.

7. The two piece quick change flow duct for creating a branch circuit of claim 1 further comprising a substantially planar seat located on the upper surface of first lower base portion, opposite the second mating section of the second nozzle section, the seat being surrounded by a U-shaped bead, the second nozzle section (12) including a U-shaped channel (25) that matingly engages the bead to lock the base and the nozzle together.

8. A two piece quick change flow duct for creating a branch circuit comprising:

a two part duct branch and plate holder for attachment to a primary duct and for diverting flow therefrom; the duct branch comprises a first lower base portion and a second upper nozzle portion matingly engaging the first lower base portion, the first lower base portion includes a first open faced U-shaped base plate holder portion that is integral with the lower base portion of the duct branch, the second upper nozzle portion including an open faced U-shaped nozzle plate holder having a cross section dimension that is less than the crossectional dimension of the open faced U-shaped base plate holder, the first and second open faced U-shaped plate holders removeably matingly engaging each other in a snap fit to form a snug fit plate holder slot, said slot is closed on three sides, comprising reinforcing ribs on flanges, transverse to the flow path, for removeably receiving a restrictor plate in a snug fit, said lower base portion having a concave surface complimentary with the primary duct for sealingly matingly and engaging and mounting to the primary duct (18) without completely severing said duct into separate pieces, said restrictor plate having a flow control tag such that when the plate is received in the plate holder, flow control aperture characteristics are easily identifiable and said plate restricts flow in accordance with the selected plate aperture, wherein the branch circuit can be easily removed by separating the nozzle portion from the base portion.

\* \* \* \* \*